United States Patent
Shin

(10) Patent No.: US 8,789,804 B2
(45) Date of Patent: Jul. 29, 2014

(54) APPARATUS FOR ADJUSTING SEAT HEIGHT OF VEHICLE

(75) Inventor: Chun-Ho Shin, Chungcheongnam-do (KR)

(73) Assignee: Han Il e Hwa Co., Ltd., Seoul (KR)

( * ) Notice: Subject to any disclaimer, the term of this patent is extended or adjusted under 35 U.S.C. 154(b) by 0 days.

(21) Appl. No.: 13/704,740

(22) PCT Filed: Jun. 20, 2011

(86) PCT No.: PCT/KR2011/004468
§ 371 (c)(1),
(2), (4) Date: Feb. 11, 2013

(87) PCT Pub. No.: WO2011/162510
PCT Pub. Date: Dec. 29, 2011

(65) Prior Publication Data
US 2013/0126684 A1 May 23, 2013

(30) Foreign Application Priority Data
Jun. 21, 2010 (KR) ........................ 10-2010-0058714

(51) Int. Cl.
*F16M 13/00* (2006.01)
(52) U.S. Cl.
USPC ......... 248/422; 248/421; 248/423; 297/344.1
(58) Field of Classification Search
USPC ......... 248/157, 421, 422, 423, 424, 425, 429, 248/430; 297/344.1, 344.11, 344.12, 297/344.13, 344.14, 344.15
See application file for complete search history.

(56) References Cited

U.S. PATENT DOCUMENTS

| | | | | |
|---|---|---|---|---|
| 5,169,112 A | * | 12/1992 | Boyles et al. | 248/550 |
| 5,176,355 A | * | 1/1993 | Carter | 248/550 |
| 5,735,509 A | * | 4/1998 | Gryp et al. | 267/131 |
| 7,712,836 B2 | * | 5/2010 | Deml | 297/344.16 |
| 2006/0237885 A1 | * | 10/2006 | Paillard et al. | 267/140.15 |
| 2009/0050220 A1 | * | 2/2009 | Kang | 137/625.44 |
| 2009/0267392 A1 | * | 10/2009 | Himmelhuber et al. | 297/217.2 |

FOREIGN PATENT DOCUMENTS

| | | |
|---|---|---|
| JP | 2008049852 A | 3/2008 |
| KR | 20-0293230 | 10/2002 |

OTHER PUBLICATIONS

International Search Report for PCT/KR2011/004468 Feb. 1, 2012.

\* cited by examiner

*Primary Examiner* — Steven Marsh
(74) *Attorney, Agent, or Firm* — Pearne & Gordon LLP

(57) ABSTRACT

Disclosed is an apparatus for adjusting a seat height of a vehicle, comprising a height adjusting lever engaged in a gear tooth structure with a height adjusting pivot and changing the gear tooth engagement structure by means of the upward and downward rotations, a height adjusting cable rotating along a cable guide by means of the upward and downward rotations of the height adjusting lever and a rotor connected with the height adjusting cable for thereby selectively pressurizing an air injection pin or an air discharge pin of a control valve depending on the rotation direction of the height adjusting cable, and adjusting an amount of air in an interior of an air spring which is connected with the control valve and adjusts the height of the seat, so the height can be conveniently adjusted, and the riding quality can be improved, and the manufacture cost can be saved.

6 Claims, 7 Drawing Sheets

US 8,789,804 B2

APPARATUS FOR ADJUSTING SEAT HEIGHT OF VEHICLE

BACKGROUND OF THE INVENTION

1. Field of the Invention

The present invention relates to an apparatus for adjusting a seat height of a vehicle, and in particular to an apparatus for adjusting a seat height of a vehicle which makes it possible to improve a seat height adjustment for a vehicle.

2. Description of Related Art

The seat of a vehicle is equipped with various apparatuses for the purpose of positioning the seatback and seat cushion depending on a passenger's body type. The technology helping adjust the angle of a seatback by operating a lever device, etc. is known. There might be provided an apparatus for adjusting the height of a seat cushion.

The conventional apparatus for adjusting the height of a seat cushion is generally formed of a cylinder and valves which control the cylinder. In case of a cylinder type height adjusting means, many elements are needed, and the manufacture process is complicated, and it is needed to pull a lever adjusting apparatus until a targeted height is obtained.

So, an apparatus is needed, which can make simple the construction of an apparatus for adjusting the height of a vehicle seat and can make it possible to easily adjust the height.

SUMMARY OF THE INVENTION

Accordingly, the present invention is made to improve the above described problems, and it is an object of the present invention to provide an apparatus for adjusting a seat height of a vehicle which makes it possible to improve a passenger's convenience and riding quality by easily adjusting a seat height of a vehicle depending on a passenger's body type.

The above explained object is not limited thereto and the non-mentioned other objects can be easily understood by an ordinary person skilled in the art.

To achieve the above objects, there is provided an apparatus for adjusting a seat height of a vehicle, comprising a height adjusting lever engaged in a gear tooth structure with a height adjusting pivot and changing an engaged structure of the gear tooth with the aid of an upward and downward rotations; a height adjusting cable inserted in a cable insertion groove formed at an inner side surface of the height adjusting lever and rotating along a cable guide with the aid of the upward and downward rotations of the height adjusting lever; and a rotor connected with the height adjusting cable for thereby selectively pressurizing an air injection pin or an air discharge pin of a control valve depending on the rotation direction of the height adjusting cable, and adjusting an amount of air in an interior of an air spring which is connected with the control valve and adjusts the height of the seat.

The height adjusting lever is connected with a shaft of the height adjusting pivot using a lever spring and a spring stopper.

The engaged structure of the gear tooth is formed as a plurality of height adjusting stages between the height adjusting pivot and the height adjusting lever.

A length of the height adjusting cable rotating along the cable guide is determined by an interval of the height adjusting stages adjusted by the rotation of the height adjusting lever.

The rotor comprises a arm rod pushed or pulled by the height adjusting cable depending on the rotation of the height adjusting lever and rotated by a pushing or pulling operation of the height adjusting cable; and a push rod engaged with a rotary shaft of the arm rod and pressurizing respectively the air injection pin and the air discharge pin of the control valve depending on the rotation of the arm rod.

The push rod comprises an upper push rod pressurizing the air injection pin provided in an upper side of the control valve depending on a clockwise rotation of the arm rod by means of the pulling operation of the height adjusting cable; and a lower push rod pressurizing the air discharge pin provided in an lower side of the control valve depending on a counterclockwise rotation of the arm rod by means of the pushing operation of the height adjusting cable.

The upper push rod and the lower push rod are respectively engaged with the arm rod rotary shaft.

The upper push rod and the lower push rod are connected by way of a push rod spring (143), and the push rod spring (143) receives a rotational force of the arm rod, so the upper push rod pressurizes the air injection pin, and the lower push rod pressurizes the air discharge pin.

DESCRIPTION OF SPECIFIC EMBODIMENTS

The advantages and features and method for achieving the same according to the present invention might be clear along with the following embodiments. However the present invention is not limited to the embodiments below, and it might be implemented in various forms, and the embodiments of the present invention can be more clear along with the embodiments, and the present invention is disclosed to the extent that an ordinary person skilled in the art can be well aware of the scope of the present invention.

Figure 1:
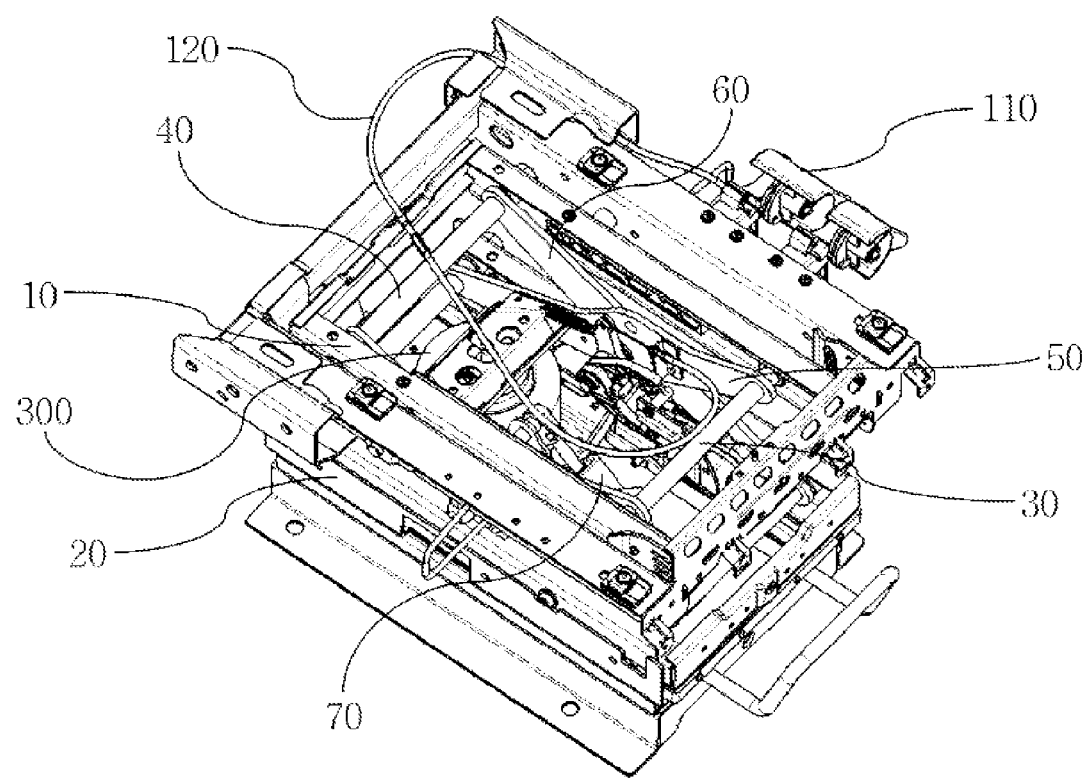
FIG. 1 is a partial cross sectional view illustrating a lower side of a seat for a vehicle.

FIG. 1 is a partial cross sectional view illustrating a seat lower side of a vehicle.

As shown in FIG. 1, the seat for a vehicle comprises a height adjusting lever 110, a height adjusting cable 120, a control valve 200 and an air spring 300. In addition, at the lower side of the seat might be provided with an upper frame 10, a lower frame 20, and a X-type link comprising an inner link 50 and an outer link 60 which interconnect the upper frame 10 and the lower frame 20.

The seat for a vehicle is fixed at the upper frame 10, and the upper frame 10 and the lower frame 20 are connected by way of the X-type link, so the height can be adjusted depending on the amount of air in the interior of the air spring 300. The X-type link is configured so that the inner link 5 and the outer link 60 are engaged. When the amount of the air in the air spring 300 rises, the whole width of the X-type link decreases, so the seat for a vehicle is raised, and when the amount of the air in the air spring 300 decreases, the whole width of the X-type link grows widened in the direction of both sides, so the seat for a vehicle descends, thus adjusting the height of the seat for a vehicle.

In an embodiment of the present invention, the means for adjusting the whole width of the X-type link might be formed of a height adjusting cable 120. In addition, the height adjusting cable 120 is connected with the height adjusting lever 110, and when the height adjusting lever 110 is rotated upward, the height adjusting cable 120 is pulled in the rotation direction of the height adjusting lever 110. On the contrary, when the height adjusting lever 110 is rotated downwardly, the height adjusting cable 120 is pushed in the rotation direction of the height adjusting lever 110. In other words, the height adjusting cable 120 can be pushed or pulled depending on the rotation of the height adjusting lever 110, so the amount of air passing through the air spring 300 can be adjusted by means of the control valve 200, thus adjusting the height of the seat for a vehicle.

In addition, the height of the seat for a vehicle can be adjusted by way of a procedure that the whole width or the height of the X-type link is adjusted depending on the flow rate of the air of the air spring 300. The whole width or the height of the X-type link can be adjusted by means of a moving shaft 30 and a fixing shaft 40. The operations of the X-type link will be described with reference to FIGS. 5A, 5B and 5C, FIG. 2 is a disassembled perspective view illustrating a height adjusting lever of an apparatus for adjusting a seat height of a vehicle according to an embodiment of the present invention.

Figure 2:
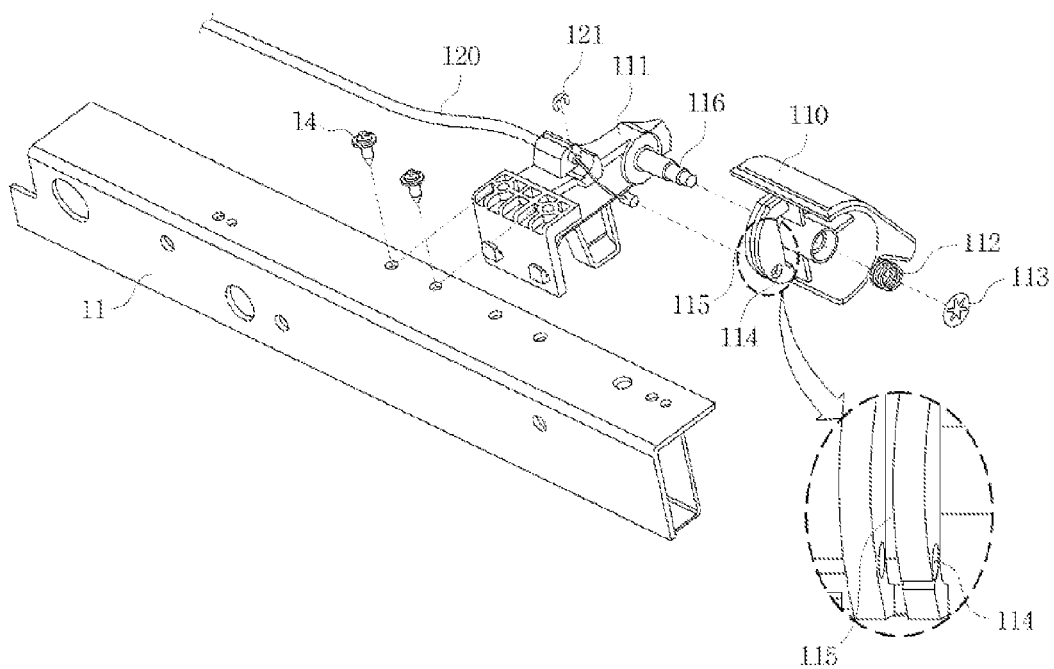
FIG. 2 is a disassembled perspective view illustrating a height adjusting lever of an apparatus for adjusting a seat height of a vehicle according to an embodiment of the present invention.

Referring to FIG. 2, the height adjusting lever 110 is a means for adjusting the height of the seat for a vehicle by way of the upward or downward rotation. The height adjusting lever 110 is connected with the height adjusting cable 120. There are provided a cable insertion hole 114 formed on an inner surface of the height adjusting lever 110 for receiving the cable, and a cable guide 115 for guiding the cable inserted in the cable insertion groove 114 depending on the rotations of the height adjusting lever 110. For example, when the height adjusting lever 110 is rotated upwardly, the height adjusting cable 120 inserted in the cable insertion hole 114 is pulled toward the height adjusting lever 110 and rotated in the rotation direction along the cable guide 115. On the contrary, when the height adjusting lever 110 is rotated downwardly, the height adjusting cable 120 inserted in the cable insertion hole 114 is pushed away from the cable guide 115 and rotated in the rotation direction along the cable guide 115.

A height adjusting pivot 111 is engaged with the height adjusting lever 110 by way of the shaft 116 of the height adjusting pivot. The height adjusting lever 110 can be engaged with the shaft 116 of the height adjusting pivot using the lever spring 112 and the spring stopper 113.

The height adjusting cable 120 is engaged with and inserted into the cable insertion hole 114 formed at the inner side of the height adjusting lever 110 by way of an E-ring provided at the upper side of the height adjusting pivot 111.

The height adjusting lever 110 is engaged with the height adjusting pivot 111 and as shown in FIG. 1 is engaged to the upper frame 10. In more details, the assembly of the height adjusting pivot 111 is engaged to the upper frame panel 11 using a screw 14.

Figure 3A:
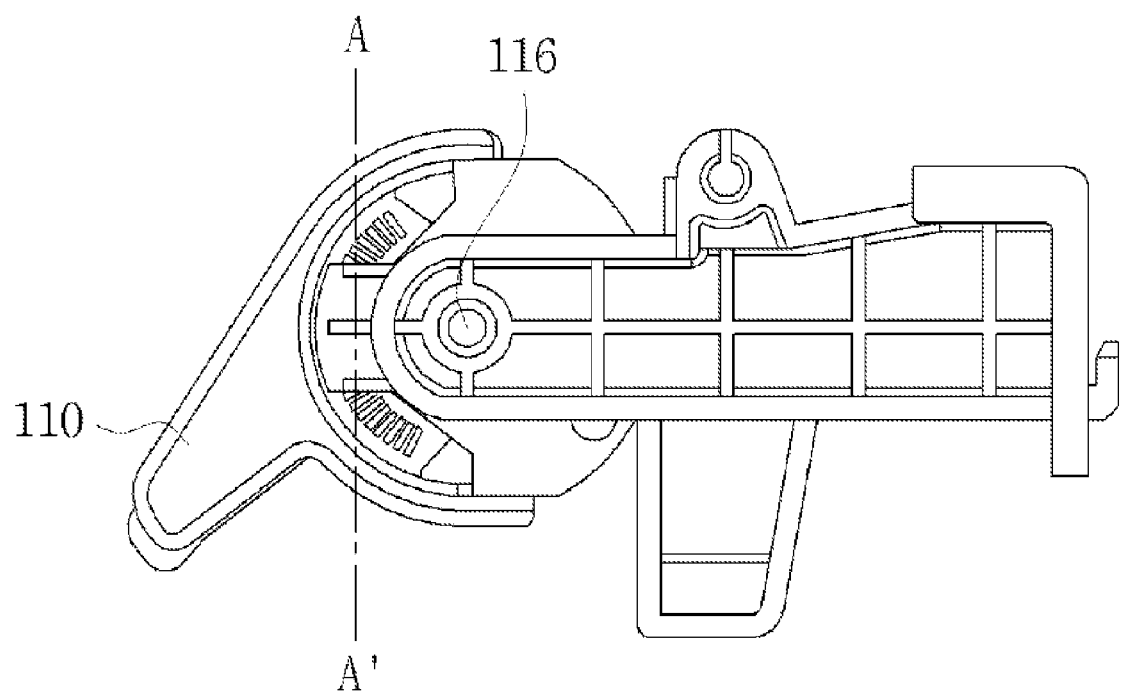
FIG. 3A is a view illustrating a construction of a height adjusting lever of FIG. 2.
Figure 3B:
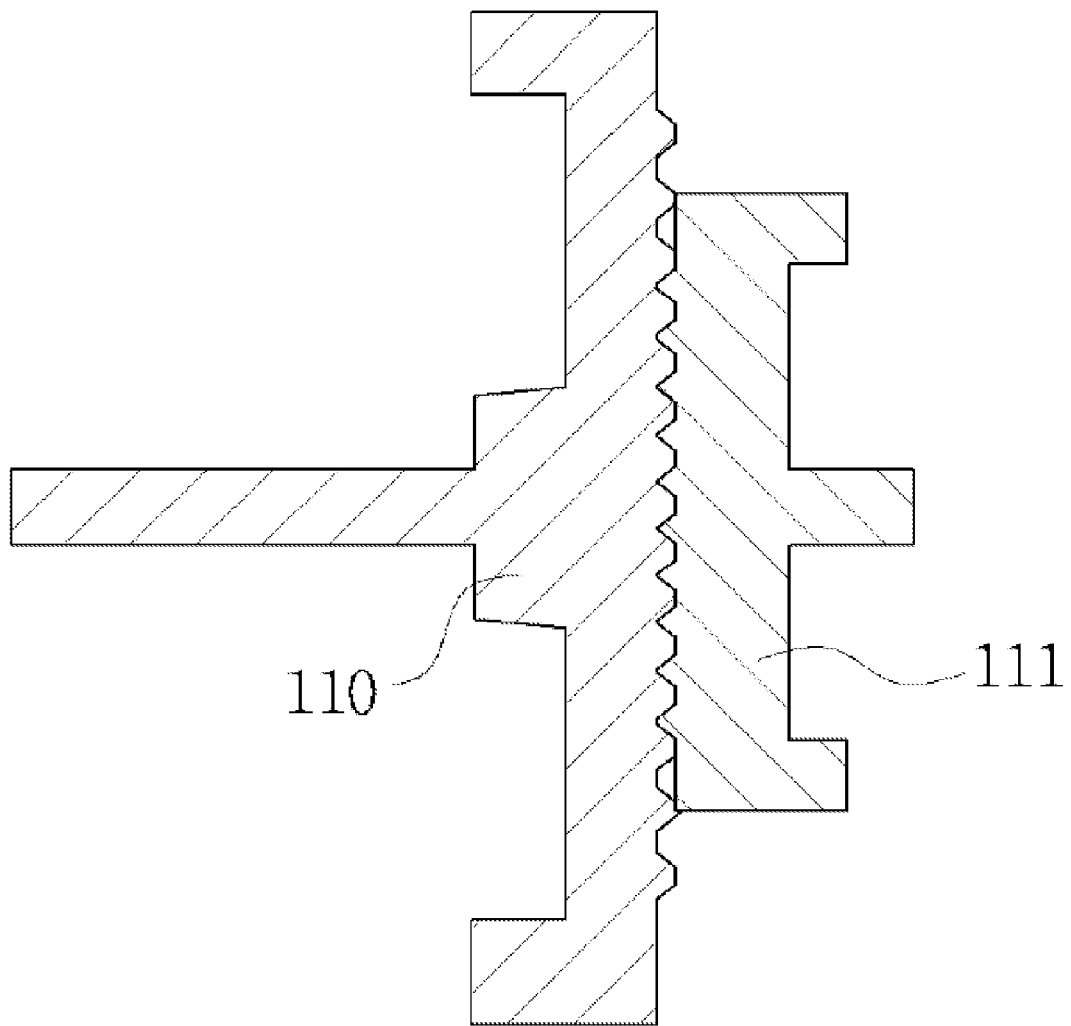
FIG. 3B is a cross sectional view taken along line A-A' of FIG. 3A.

FIG. 3A is a structural view of the height adjusting lever of FIG. 2, and FIG. 3B is a cross sectional view taken along line A-A' of FIG. 3A.

As shown in FIGS. 3A and 3B, the height adjusting lever 110 comprises a handle means with which a passenger can adjust the downward or upward rotation direction by stretching a hand in the direction for a seat when the passenger sits on the seat for a vehicle. In addition, the height adjusting lever 110 is engaged with the shaft 116 of the height adjusting pivot. The engaged structure of the height adjusting lever 110 and the height adjusting pivot 111 is shown in FIG. 3B.

The height adjusting lever 110 and the height adjusting pivot 111 are engaged by way of a tooth-shaped gear with a regular interval. When the height adjusting lever 110 is rotated in a certain direction, the tooth-shaped gear rotates by one tooth in response to the rotation direction. The height adjusting cable 120 is rotated as much as one tooth in response to the rotation direction, so that the height of the seat for a vehicle can be constantly adjusted. For example, when the height adjusting lever 110 is rotated upwardly, the tooth shape structure of the height adjusting lever moves upwardly by one tooth, so it comes to engage with another tooth shape structure of the height adjusting pivot.

When the height adjusting lever 110 is rotated tooth by tooth owing to the engagement of the tooth shaped structure, the height of the seat for a vehicle can be adjusted as much as it. When the operation is stopped, the engagement of the tooth-shaped structure is fixed, so the height can be fixed constant. When a passenger memories the adjusting stage of a desired height, the passenger can adjust the same height of the seat, thus achieving a passenger's improved riding quality and convenience. The number of the height adjusting stages by means of the tooth-shaped gear structure according to the present invention is 16 stages, so the heights can be adjusted in a range of 80 mm (16 mm×5 mm).

Figure 4:
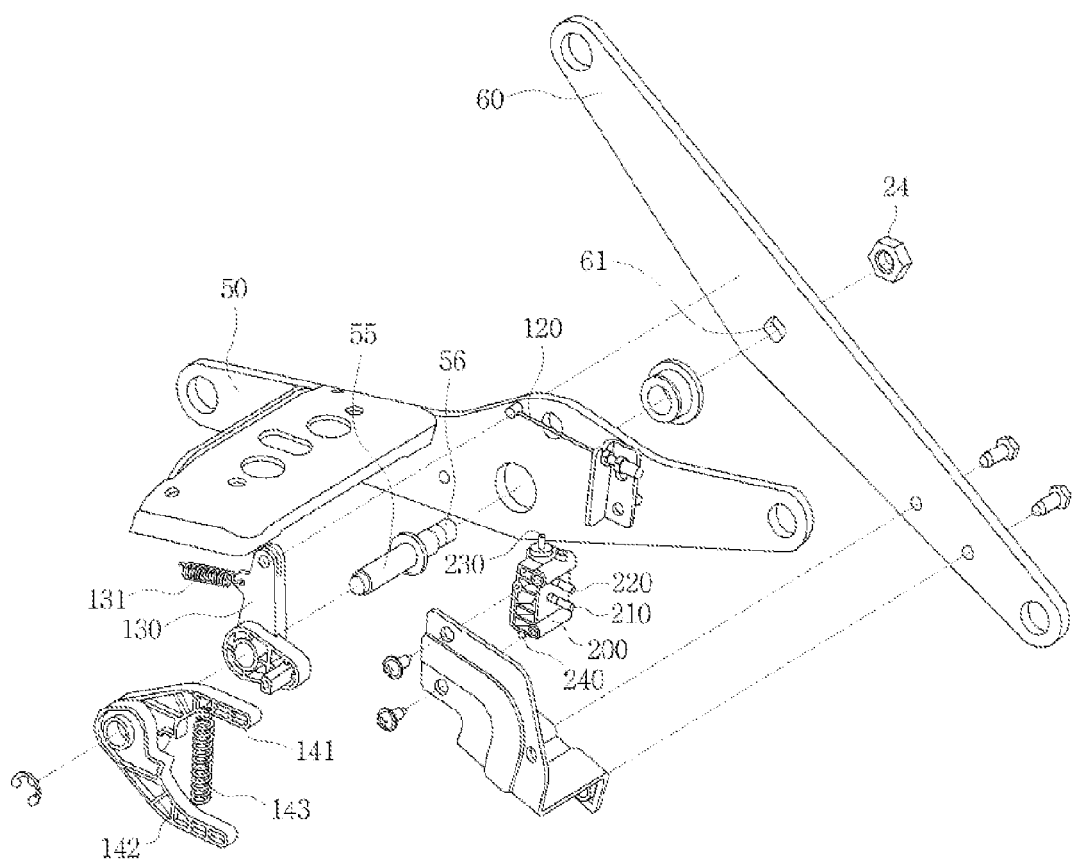
FIG. 4 is a disassembled perspective view illustrating a frame link which is equipped with an apparatus for adjusting a seat height of a vehicle according to an embodiment of the present invention.

FIG. 4 is a disassembled perspective view illustrating a X-type link which is equipped with an apparatus for adjusting a seat height of a vehicle according to an embodiment of the present invention.

The X-type link is formed of an inner link 50 and an outer link 60. The inner link 50 and the outer link 60 form a central shaft by way of a shaft key 55 and a guide flat 56 while passing through each other. The guide flat 56 passes through a key groove 61 of the outer link 60 and is engaged with a key fixing link 24. At the upper side of the inner link 50 is engaged the height adjusting cable 120.

A arm rod 130 is axially engaged to the inner link 50 by way of the shaft key 55, and an arm rod spring 131 is connected with the air spring 300, and the end portion of the arm rod 130 is connected with the height adjusting cable 120, so the rotation direction of the arm rod 130 can be adjusted depending on the rotation (motion) of the height adjusting cable 120. The center of the arm rod 130 is axially connected with the center of the push rod 140, and the rotation of the arm rod 130 causes the upper push rod 141 and the lower push rod 142 to rotate. In addition, the upper push rod 141 and the lower push rod 142 are interconnected by the push rod spring (143) 143. The lower push rod 142 pressurizes an air discharge pin 240 and the upper push rod 141 pressurizes an air injection pin 230 by way of an attracting operation between the lower push rod 142 and the upper push rod 141 caused by the rotational contact of the arm rod 130.

The control valve 200 comprises a compression air supply port 210 connected with an external compression air tank (400 of FIG. 5A) and receiving a compressed air, and an air spring connection port 220 connected with the air spring 300 so as to supply the air from the compression air tank to the air spring 300. An air discharge pin 240 is provided at a lower side, and at an upper side is disposed an air injection pin 230.

Figure 5A:
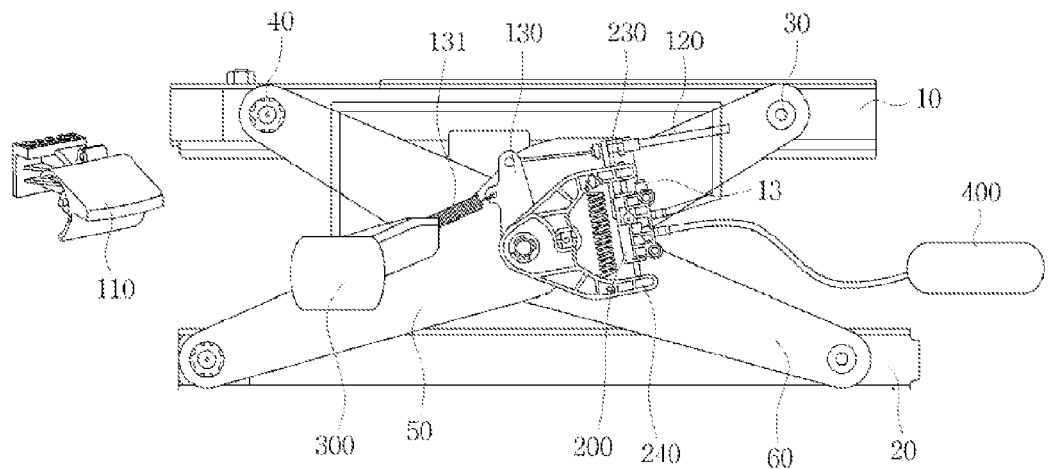
FIG. 5A is a view illustrating a construction of an apparatus for adjusting a seat height of a vehicle according to an embodiment of the present invention in a standard state in which the height is not adjusted.
Figure 5B:
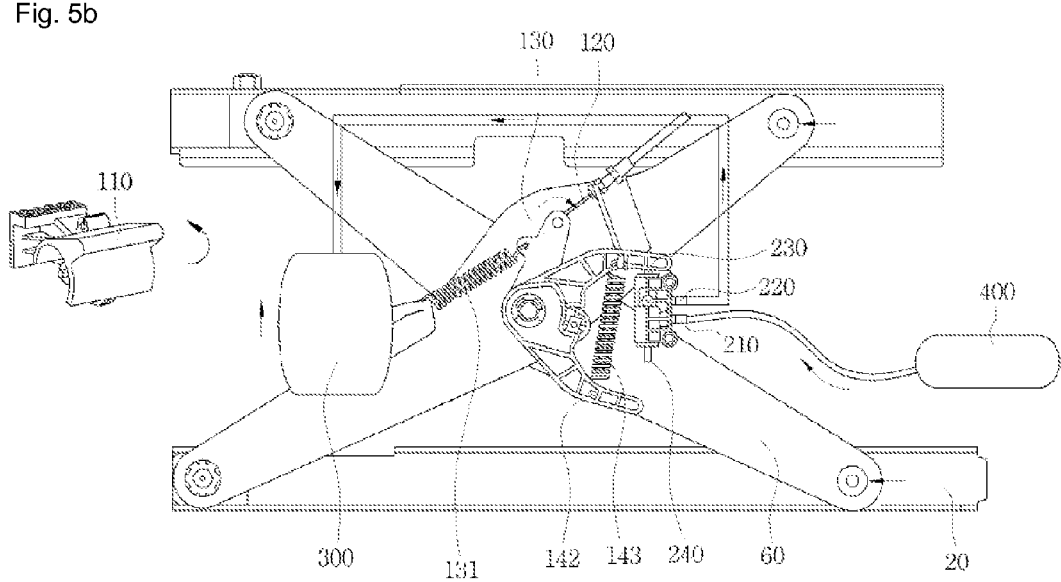
FIG. 5B is a view illustrating a construction of an apparatus for adjusting a seat height of a vehicle according to an embodiment of the present invention when a height adjusting lever is rotated upward.
Figure 5C:
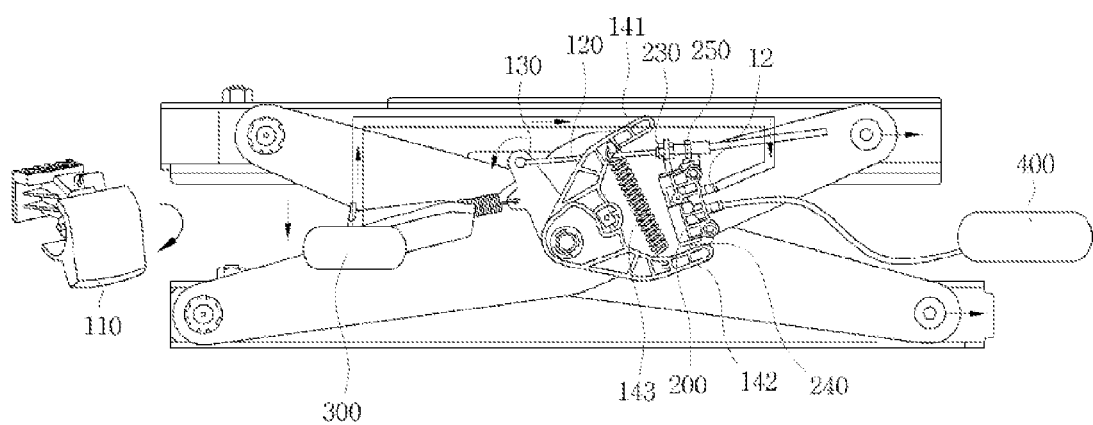
FIG. 5C is a view illustrating a construction of an apparatus for adjusting a seat height of a vehicle according to an embodiment of the present invention when a height adjusting lever is rotated downward.

FIG. 5A is a view illustrating a construction of an apparatus for adjusting a seat height of a vehicle according to an embodiment of the present invention in a standard state in which the height is not adjusted. FIG. 5B is a view illustrating a construction of an apparatus for adjusting a seat height of a vehicle according to an embodiment of the present invention when the height adjusting lever is rotated upwardly. FIG. 5C is a view illustrating a construction of an apparatus for adjusting a seat height of a vehicle according to an embodiment of the present invention when the height adjusting lever is rotated downwardly.

Referring to FIG. 5A, when a passenger sits on the seat without adjusting the height of the seat for a vehicle, the upper frame 10 and the lower frame 20 have the standard height. Since the upper push rod 141 and the lower push rod 142 do not pressurize the air injection pin 230 and the air discharge pin 240 of the control valve 200, the amount of air in the air spring 300 keeps constant, so the moving shaft 30 of the upper frame 10 does not move, and there are not changes in the whole width or height of the X-type link.

When the height adjusting lever 110 is rotated upwardly, referring to FIG. 5B, the operations that the height of the seat for a vehicle is raised will be described. As shown in FIG. 5B, when the height adjusting lever 110 is rotated upwardly, the height adjusting cable 120 connected with the height adjusting lever 110 is pulled toward the height adjusting lever 110 depending on the rotation direction. The end portion of the height adjusting cable 120 is connected with the arm rod 130, so the arm rod 130 is rotated by a certain angle in the clockwise direction on the central shaft. The above-mentioned certain angle corresponds to the distance that the tooth-shaped gear of the height adjusting lever 110 and the height adjusting pivot 111 has moved.

The rotation of the arm rod 130 causes the lower push rod 142 to rotate in the clockwise direction. With the rotation in the clockwise direction of the lower push rod 142, the push rod spring (143) 143 pulls the upper push rod 143 so the upper push rod 143 comes to pressurize the air injection pin 230 of the control valve 200. When the air injection pin 230 is pressurized, the compressed air of the compression air tank 400 is supplied by way of the compressed air supply port 210 of the control valve 200. The air spring 300 expands by means of the supplied compressed air. The expansion of the air spring 300 is transferred to the moving shaft 30 of the upper frame 10, and the moving shaft 30 moves leftwardly, so the whole width of the X-type link reduces, and the height is raised. So, the height of the seat for a vehicle can be raised.

When the height adjusting lever 110 is rotated downwardly, referring to Fire 5C, the operations that the height of the seat for a vehicle is lowered will be described. As shown in FIG. 5C, when the height adjusting lever 110 is rotated downwardly, the height adjusting cable 120 connected with the height adjusting lever 110 is pushed away from the height adjusting lever 110 depending on the rotation direction. The end portion of the height adjusting cable 120 is connected with the arm rod 130, so the arm rod 130 is rotated in the counterclockwise direction on the central shaft by a certain angle. The above-mentioned certain angle corresponds to the distance that the tooth-shaped structure of the height adjusting lever 110 and the height adjusting pivot 111 has moved.

The rotation of the arm rod 130 causes the upper push rod 141 to rotate in the counterclockwise direction. With the rotation in the counterclockwise direction of the upper push rod 141, the push rod spring (143) 143 pulls the lower push rod 142, so the lower push rod 142 pressurizes the air discharge pin 240 of the control valve 200. When the air discharge pin 240 is pressurized, the compressed air in the interior of the air spring 300 is discharged to the outside via an exhaust port 251 positioned at the upper side of the control valve 200. The air spring 300 is contracted by means of the discharged air. The contraction of the air spring 300 is transferred to the moving shaft 30 of the upper frame 10, and as the moving shaft 30 moves rightwardly, the whole width of the X-type link increases, and the height is lowered. So, the height of the seat for a vehicle can be lowered.

As shown in FIGS. 5B and 5C, the height of the seat for a vehicle can be adjusted as much as the adjusted amount of the height adjusting lever 110. So, the rotation adjustment of the height adjusting lever 110 is transferred to the arm rod 130 by way of the height adjusting cable 120, thus rotating the arm rod 130. The upper push rod 141 and the lower push rod 142 connected by the push rod spring (143) 143 are rotated, so the air injection pin 230 or the air discharge pin 240 of the control valve 200 can be selectively pressurized. So, the height of the seat for a vehicle can be adjusted by handling only the height adjusting cable 120 without adapting a cylinder or a valve device in such a way that the amount of the compressed air in the interior of the air spring 300 is adjusted.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

INDUSTRIAL APPLICABILITY

According to the present invention, it is possible to easily adjust the height of a seat for a vehicle as compared to a conventional cylinder type height adjusting apparatus.

In other words, the adjustment of a seat for a vehicle can be performed by handling a cable without adapting a cylinder or a valve in such a way that the arm rod is rotated by handling a height adjusting cable, and a push rod connected with a push rod spring (143) is rotated, and an air injection pin or an air discharge pin of a control valve is selectively pressurized.

In addition, the simple structure and the simple assembling process can be achieved, and the unit cost for manufactures can be lowered.

What is claimed is:

1. An apparatus for adjusting a seat height of a vehicle, comprising:
   a height adjusting lever (110) engaged in a gear tooth structure with a height adjusting pivot (111) and changing an engaged structure of the gear tooth with the aid of an upward and downward rotations;
   a height adjusting cable (120) inserted in a cable insertion groove (114) formed at an inner side surface of the height adjusting lever (110) and rotating along a cable guide (115) with the aid of the upward and downward rotations of the height adjusting lever (110); and
   a rotor connected with the height adjusting cable (120) for thereby selectively pressurizing an air injection pin (230) or an air discharge pin (240) of a control valve (200) depending on the rotation direction of the height adjusting cable (120), and adjusting an amount of air in an interior of an air spring (300) which is connected with the control valve (200) and adjusts the height of the seat, wherein the height adjusting lever (110) is connected with a shaft (116) of the height adjusting pivot (111) using a lever spring (112) and a spring stopper (113).

2. The apparatus of claim 1, wherein the engaged structure of the gear tooth is formed as a plurality of height adjusting stages between the height adjusting pivot (111) and the height adjusting lever (110).

3. The apparatus of claim 2, wherein a length of the height adjusting cable (120) rotating along the cable guide (115) is determined by an interval of the height adjusting stages adjusted by the rotation of the height adjusting lever (110).

4. An apparatus for adjusting a seat height of a vehicle, comprising:
a height adjusting lever (110) engaged in a gear tooth structure with a height adjusting pivot (111) and changing an engaged structure of the gear tooth with the aid of an upward and downward rotations;
a height adjusting cable (120) inserted in a cable insertion groove (114) formed at an inner side surface of the height adjusting lever (110) and rotating along a cable guide (115) with the aid of the upward and downward rotations of the height adjusting lever (110); and
a rotor connected with the height adjusting cable (120) for thereby selectively pressurizing an air injection pin (230) or an air discharge pin (240) of a control valve (200) depending on the rotation direction of the height adjusting cable (120), and adjusting an amount of air in an interior of an air spring (300) which is connected with the control valve (200) and adjusts the height of the seat, wherein the rotor comprises:
a arm rod (130) pushed or pulled by the height adjusting cable (120) depending on the rotation of the height adjusting lever (110) and rotated by a pushing or pulling operation of the height adjusting cable (120); and
a push rod (140) engaged with a rotary shaft of the arm rod (130) and pressurizing respectively the air injection pin (230) and the air discharge pin (240) of the control valve (200) depending on the rotation of the arm rod (130).

5. The apparatus of claim 4, wherein the push rod (140) comprises:
an upper push rod (141) pressurizing the air injection pin (230) provided in an upper side of the control valve (200) depending on a clockwise rotation of the arm rod (130) by means of the pulling operation of the height adjusting cable (120); and
a lower push rod (142) pressurizing the air discharge pin (240) provided in an lower side of the control valve (200) depending on a counterclockwise rotation of the arm rod (130) by means of the pushing operation of the height adjusting cable (120), and wherein the upper push rod (141) and the lower push rod (142) are respectively engaged with the rotary shaft of the arm rod (130).

6. The apparatus of claim 5, wherein the upper push rod (141) and the lower push rod (142) are connected by way of a push rod spring (143), and the push rod spring (143) receives a rotational force of the arm rod (130), so the upper push rod (141) pressurizes the air injection pin (230), and the lower push rod (142) pressurizes the air discharge pin (240).

* * * * *